(12) United States Patent
Vangala et al.

(10) Patent No.: US 12,317,326 B2
(45) Date of Patent: May 27, 2025

(54) RESOLUTION OF MISMATCH IN CALCULATION OF RANDOM ACCESS RADIO NETWORK TEMPORARY IDENTIFIER

(71) Applicant: Apple Inc., Cupertino, CA (US)

(72) Inventors: Sarma V. Vangala, Campbell, CA (US); Tarik Tabet, Los Gatos, CA (US); Chunxuan Ye, San Diego, CA (US); Dawei Zhang, Saratoga, CA (US); Fangli Xu, Beijing (CN); Haijing Hu, Beijing (CN); Murtaza A Shikari, Mountain View, CA (US); Naveen Kumar R Palle Venkata, San Diego, CA (US); Rafael L Rivera-Barreto, Santa Clara, CA (US); Ralf Rossbach, Munich (DE); Sreevalsan Vallath, Dublin, CA (US); Srinivasan Nimmala, San Jose, CA (US); Wei Zeng, San Diego, CA (US); Yuqin Chen, Shenzhen (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 474 days.

(21) Appl. No.: 17/437,808

(22) PCT Filed: Aug. 5, 2020

(86) PCT No.: PCT/CN2020/107210
§ 371 (c)(1),
(2) Date: Sep. 9, 2021

(87) PCT Pub. No.: WO2022/027365
PCT Pub. Date: Feb. 10, 2022

(65) Prior Publication Data
US 2022/0304062 A1 Sep. 22, 2022

(51) Int. Cl.
*H04W 74/0833* (2024.01)
*H04W 24/08* (2009.01)
(Continued)

(52) U.S. Cl.
CPC ....... *H04W 74/0833* (2013.01); *H04W 24/08* (2013.01); *H04W 74/006* (2013.01); *H04W 74/002* (2013.01); *H04W 76/11* (2018.02)

(58) Field of Classification Search
CPC ..... H04W 8/26; H04W 24/08; H04W 74/006; H04W 74/008; H04W 74/0833; H04W 74/0836; H04W 74/0838; H04W 76/11
See application file for complete search history.

(56) References Cited

U.S. PATENT DOCUMENTS 10,433,342 B2 10/2019 Akkarakaran
10,477,591 B2 11/2019 Jung
(Continued)

FOREIGN PATENT DOCUMENTS

CN 109495222 3/2019
CN 110876205 3/2020
(Continued)

OTHER PUBLICATIONS

Translation of WO-2020088191 (Year: 2020).*
(Continued)

*Primary Examiner* — Ivan O Latorre
(74) *Attorney, Agent, or Firm* — Kowert, Hood, Munyon, Rankin & Goetzel, P.C.

(57) ABSTRACT

A base station may operate in a context where the propagation delay between the base station and user equipment (UE) devices is large. The base station configures UE devices with a common delay. The base station receives a random access preamble from a UE device. The base station determines a time slot in which the random access preamble (Continued)

was transmitted, based on a configured correspondence between allowable time slots and subsets of an available set of preambles. The base station computes a Random Access Radio Network Temporary Identifier (RA-RNTI) based on parameter values including an index, of the determined time slot. The base station employs the computed RA-RNTI to address a random access response for the UE device.

19 Claims, 13 Drawing Sheets

(51) Int. Cl.
*H04W 74/00* (2009.01)
*H04W 76/11* (2018.01)

(56) References Cited

U.S. PATENT DOCUMENTS

| | | | |
|---|---|---|---|
| 11,552,700 B2* | 1/2023 | Charbit | H04L 1/1851 |
| 2020/0229157 A1 | 7/2020 | Rastegardoost et al. | |
| 2020/0351957 A1* | 11/2020 | Kim | H04W 74/0866 |
| 2021/0321464 A1* | 10/2021 | Lin | H04B 7/1851 |
| 2022/0022136 A1* | 1/2022 | Hofström | H04W 76/28 |
| 2022/0256445 A1* | 8/2022 | Sedin | H04B 7/18539 |
| 2023/0049998 A1* | 2/2023 | Li | H04W 56/0045 |

FOREIGN PATENT DOCUMENTS

| | | | |
|---|---|---|---|
| CN | 111132364 | | 5/2020 |
| EP | 3683994 | * | 7/2020 |
| WO | 2014205723 | | 12/2014 |
| WO | 2019047599 | | 3/2019 |
| WO | 2019216798 | | 11/2019 |
| WO | WO 2020/042808 A1 * | | 3/2020 |
| WO | WO-2020088191 A1 * | 5/2020 | H04L 1/0061 |
| WO | 2020151754 | | 7/2020 |
| WO | WO 2021/163968 A1 * | | 8/2021 |

OTHER PUBLICATIONS

International Search Report for PCT Patent Application No. PCT/CN2020/107210; mailed Apr. 26, 2021.

Huawei et al. "Random access without location information"; 3GPP TSG-RAN WG2 Meeting 107Bis R2-1913784; Chongqing, China; Oct. 18, 2019.

Nokia et al. "Doppler Compensation, Uplink Timing Advance and Random Access in NTN"; 3GPP TSG RAN WG1 #99 R1-1913017; Reno, USA; Nov. 22, 2019.

Huawei et al. "Discussion on timing advance and RACH procedures for NTN"; 3GPP TSG RAN WG1 Meeting #96bis R1-1904000; Xi'an, China; Apr. 12, 2019.

3GPP TSG RAN Radio Resource Control (RRC) protocol specification (Release 16) 3GPP TS 38.331 V16.0.0; Mar. 31, 2020.

Office Action for CN Patent Application No. 202080103331.1; Jun. 24, 2024.

Zte et al. "Random Access Procedure and RACH Capacity inNTN_v1", 3GPP TSG-RAN WG2 Meeting #106 R2-1908246, May 13, 2019.

Zte et al. "Report of Email Discussion [107#60] [NR/NTN] RACH capacity evaluation and procedures", 3GPP TSG-RAN WG2 Meeting #107bis R2-1912664, Oct. 14, 2019.

Office Action for CN Patent Application No. 202080103332.6; Aug. 19, 2024.

Etri "Common delay for initial access," 3GPP TSG-RAN WG2 Meeting #107bis R2-1913876; Oct. 14, 2019.

Etri "Considerations on propagation delay for Non-Terrestrial Networks," 3GPP TSG RAN WG1 #96bis R1-1904669; Apr. 8, 2019.

Zte et al. "On Doppler shift compensation and Timing Advance in NTN," Discussion on the ambiguity of preamble reception in NTN RACH procedure R1-1907390; Apr. 8, 2019.

International Search Report for PCT Patent Application No. PCT/CN2020/107125; Apr. 28, 2021.

ZTE Corporation et al. "Discussion on the ambiguity of preamble reception in NTN RACH procedure"; 3GPP TSG RAN WG2 Meeting #105bis R2-1903390; Apr. 12, 2019.

ZTE Corporation et al. "Report of Email Discussion [107#60] [NR/NTN] RACH capacity evaluation and procedures"; 3GPP TSG-RAN WG2 Meeting #107bis R2-1912664; Oct. 18, 2019.

Nokia et al. "Doppler Compensation, Uplink Timing Advance, Random Access and UE Location in NTN"; 3GPP TSG RAN WG1 WG1 Meeting #98bis R1-1911220; Oct. 20, 2019.

ZTE "Enhanced for UL grant free transmission" 3GPP TSG RAN WG1 #97 R1-1906414; May 17, 2019.

* cited by examiner

```
RACH-ConfigCommon ::=            SEQUENCE {
  rach-ConfigGeneric             RACH-ConfigGeneric,
  totalNumberOfRA-Preambles INTEGER (1..63) OPTIONAL,  -- Need S
  ssb-perRACH-OccasionAndCB-PreamblesPerSSB  CHOICE {
    oneEighth ENUMERATED {n4, n8, n12, n16, n20, n24, n28, n32, n36, n40, n44,
                          n48, n52, n56, n60, n64},
    oneFourth ENUMERATED {n4, n8, n12, n16, n20, n24, n28, n32, n36, n40, n44,
                          n48, n52, n56, n60, n64},
    oneHalf   ENUMERATED {n4, n8, n12, n16, n20, n24, n28, n32, n36, n40, n44,
                          n48, n52, n56, n60, n64},
    one       ENUMERATED {n4, n8, n12, n16, n20, n24, n28, n32, n36, n40, n44, n48,
                          n52, n56, n60, n64},
    two       ENUMERATED {n4, n8, n12, n16, n20, n24, n28, n32},
    four               INTEGER (1..16),
    eight              INTEGER (1..8),
    sixteen            INTEGER (1..4)
  } OPTIONAL,  -- Need M groupBconfigured         SEQUENCE {
    ra-Msg3SizeGroupA ENUMERATED {b56, b144, b208, b256, b282, b480, b640,
                       b800, b1000, spare7, spare6, spare5, spare4, spare3, spare2, spare1},
    messagePowerOffsetGroupB  ENUMERATED { minusinfinity, dB0, dB5,
                                          dB8, dB10, dB12, dB15, dB18},
    numberOfRA-PreamblesGroupA  INTEGER (1..64)
  } OPTIONAL,  -- Need R ra-ContentionResolutionTimer  ENUMERATED { sf8, sf16, sf24, sf32, sf40, sf48,
                                             sf56, sf64},
  rsrp-ThresholdSSB    RSRP-Range       OPTIONAL,  -- Need R
  rsrp-ThresholdSSB-SUL RSRP-Range      OPTIONAL,  -- Need R
  prach-RootSequenceIndex       CHOICE {
    l839             INTEGER (0..837),
    l139             INTEGER (0..137)
  },
  msg1-SubcarrierSpacing   SubcarrierSpacing,
  restrictedSetConfig  ENUMERATED {unrestrictedSet, restrictedSetTypeA,
                                   restrictedSetTypeB},
  msg3-transformPrecoder  ENUMERATED {enabled} OPTIONAL,  -- Need R
  ...
}
```

FIG. 10A

```
RACH-ConfigGeneric ::=         SEQUENCE {
    prach-ConfigurationIndex       INTEGER (0..255),
    msg1-FDM                       ENUMERATED {one, two, four, eight},
    msg1-FrequencyStart            INTEGER (0..maxNrofPhysicalResourceBlocks-1),
    zeroCorrelationZoneConfig      INTEGER(0..15),
    preambleReceivedTargetPower    INTEGER (-200..-74),
    preambleTransMax               ENUMERATED {n3, n4, n5, n6, n7, n8, n10, n20,
                                               n50, n100, n200},
    powerRampingStep               ENUMERATED {dB0, dB2, dB4, dB6},
    ra-ResponseWindow              ENUMERATED {sl1, sl2, sl4, sl8, sl10, sl20, sl40,
                                               sl80}
}
```

FIG. 10B

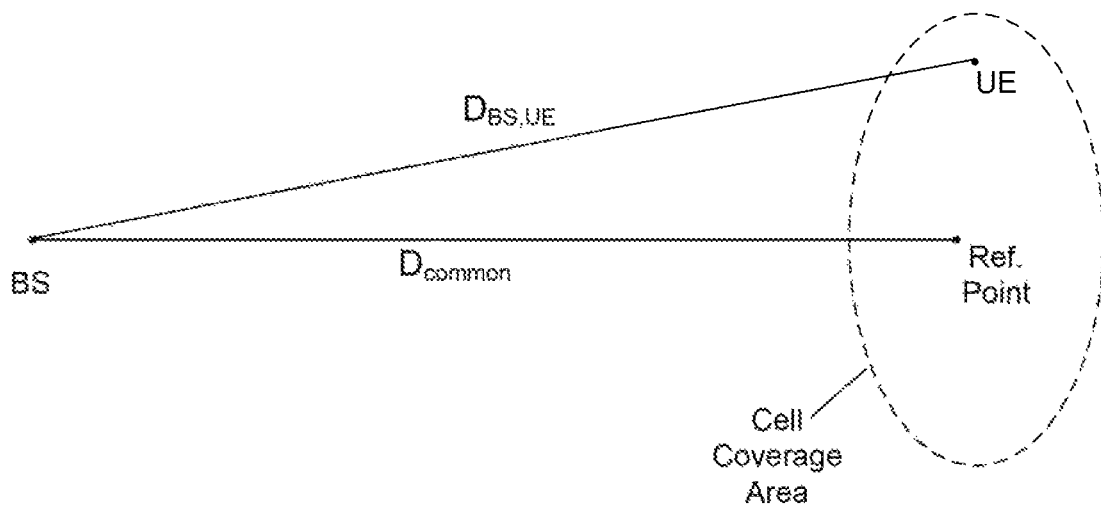

FIG. 10C

| PRACH Config. Index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | $x$ | $y$ | | | | | |
| 0 | 0 | 16 | 1 | 1 | 0 | - | - | 0 |
| 1 | 0 | 16 | 1 | 4 | 0 | - | - | 0 |
| 2 | 0 | 16 | 1 | 7 | 0 | - | - | 0 |
| 3 | 0 | 16 | 1 | 9 | 0 | - | - | 0 |
| 4 | 0 | 8 | 1 | 1 | 0 | - | - | 0 |
| 5 | 0 | 8 | 1 | 4 | 0 | - | - | 0 |
| 6 | 0 | 8 | 1 | 7 | 0 | - | - | 0 |
| 7 | 0 | 8 | 1 | 9 | 0 | - | - | 0 |
| 8 | 0 | 4 | 1 | 1 | 0 | - | - | 0 |
| 9 | 0 | 4 | 1 | 4 | 0 | - | - | 0 |
| 10 | 0 | 4 | 1 | 7 | 0 | - | - | 0 |
| 11 | 0 | 4 | 1 | 9 | 0 | - | - | 0 |
| 12 | 0 | 2 | 1 | 1 | 0 | - | - | 0 |
| 13 | 0 | 2 | 1 | 4 | 0 | - | - | 0 |
| 14 | 0 | 2 | 1 | 7 | 0 | - | - | 0 |
| 15 | 0 | 2 | 1 | 9 | 0 | - | - | 0 |
| 16 | 0 | 1 | 0 | 1 | 0 | - | - | 0 |
| 17 | 0 | 1 | 0 | 4 | 0 | - | - | 0 |
| 18 | 0 | 1 | 0 | 7 | 0 | - | - | 0 |
| 19 | 0 | 1 | 0 | 1,6 | 0 | - | - | 0 |
| 20 | 0 | 1 | 0 | 2,7 | 0 | - | - | 0 |
| 21 | 0 | 1 | 0 | 3,8 | 0 | - | - | 0 |
| 22 | 0 | 1 | 0 | 1,4,7 | 0 | - | - | 0 |
| 23 | 0 | 1 | 0 | 2,5,8 | 0 | - | - | 0 |
| 24 | 0 | 1 | 0 | 3,6,9 | 0 | - | - | 0 |
| 25 | 0 | 1 | 0 | 0,2,4,6,8 | 0 | - | - | 0 |
| 26 | 0 | 1 | 0 | 1,3,5,7,9 | 0 | - | - | 0 |
| 27 | 0 | 1 | 0 | 0,1,2,3,4,5,6,7,8,9 | 0 | - | - | 0 |
| 28 | 1 | 16 | 1 | 1 | 0 | - | - | 0 |
| 29 | 1 | 16 | 1 | 4 | 0 | - | - | 0 |
| 30 | 1 | 16 | 1 | 7 | 0 | - | - | 0 |
| 31 | 1 | 16 | 1 | 9 | 0 | - | - | 0 |
| 32 | 1 | 8 | 1 | 1 | 0 | - | - | 0 |

```
receive a random access preamble from a user equipment (UE) device  1310
                              ↓
determine a time slot in which the random access preamble was transmitted
based on a configured correspondence between allowable time slots and
subsets of an available set of random access preambles   1315
                              ↓
compute a Random Access Radio Network Temporary Identifier (RA-RNTI)
based on parameter values including an index of the determined time slot
1320
                              ↓
generate a random access response for the UE device, in response to
reception of the random access preamble   1325
                              ↓
generate a Physical Downlink Control Channel (PDCCH), where the action of
generating the PDCCH includes scrambling a Cyclic Redundancy Checksum
(CRC) of downlink control information (DCI) using the RA-RNTI   1330
                              ↓
transmit the PDCCH and the random access response   1335
```

*FIG. 13*

RESOLUTION OF MISMATCH IN CALCULATION OF RANDOM ACCESS RADIO NETWORK TEMPORARY IDENTIFIER

FIELD

The present disclosure relates to the field of wireless communication, and more particularly, to mechanisms enabling a base station (or access node) to facilitate random access by user equipments devices when the propagation delay between the base station and the UE devices is large.

DESCRIPTION OF THE RELATED ART

When the distance between a base station and user equipment (UE) device is large, e.g., larger than a slot duration (or subframe duration), the ability of the UE device to successfully perform random access may be compromised. As part of the random access procedure, the UE device may calculate a Random-Access Radio Network Temporary Identifier (RA-RNTI) based on the index of a time slot in which it transmits a random access preamble. The base station may separately calculate an RA-RNTI based on the index of a time slot in which the preamble is received. In prior art networks, the two indices are identical since the propagation delay between the UE device and the base station is substantially smaller than a slot duration. Thus, the separately computed RA-RNTIs are equal. However, if the propagation delay between the UE device and base station is sufficiently large, the two time indices will disagree, causing a mismatch between the separately computed RA-RNTIs. Thus, when the base station transmits a random access response (RAR) based on its RA-RNTI, the UE device will fail to recognize the RAR since its process of monitoring for RAR transmission is based on a different RA-RNTI. Therefore, there exists a need for mechanisms capable of resolving the RA-RNTI mismatch in the context of networks having large propagation delay (LPD) between UE device and base station.

SUMMARY

In one set of embodiments, a method for operating a base station may include one or more of the following. (The base station may be configured to operate in a context where the propagation delay between the base station and UE devices is large, e.g., larger than a slot duration, or larger than a radio frame duration.) The base station may receive a random access preamble from a user equipment (UE) device. The base station may determine a time slot in which the random access preamble was transmitted based on a configured correspondence between allowable time slots and subsets of an available set of random access preambles. The base station may compute a Random Access Radio Network Temporary Identifier (RA-RNTI) based on parameter values including an index of the determined time slot. The base station may generate a random access response for the UE device, in response to reception of the random access, preamble. The base station may generate a Physical Downlink Control Channel (PDCCH), where the action of generating the PDCCH includes scrambling a Cyclic Redundancy Checksum (CRC) of downlink control information (DCI) using the RA-RNTI. (The expression, "scrambling the CRC" is meant to include scrambling the entire CRC, or scrambling only a subset of the CRC bits.) The downlink control information may correspond to the random access response, e.g., point to a PDSCH resource containing the random access response for the UE. The base station may transmit the PDCCH and the random access response, e.g., as part of a subframe of a downlink signal. The UE device, having independently computed the RA-RNTI, may monitor subframes of the downlink signal for DCI whose CRC has been scrambled with the RA-RNTI.

In some embodiments, the method may also include, prior to receiving the random access preamble, transmitting a common delay value to UE devices in a cell coverage area of the base station.

In some embodiments, the method may also include determining a differential round trip time (RTT) based on (a) a time at which the random access preamble was received at the base station and (b) a time of the base station's transmission of a particular slot whose time index agrees with the determined time slot.

In some embodiments, the method may also include transmitting an indication (e.g., an implicit indication) of a differential delay value to the UE device, where the differential delay value is one half the differential RTT. The UE device may use the differential delay value together with the common delay value to determine a total delay, and apply a timing advance based on the total delay, e.g., so that its uplink transmissions will arrive at the base station in synchrony with the base station's timing, and/or, so that its reception of downlink channels will be synchronized with the arrival of those channels at the UE device.

In some embodiments, the method may also include broadcasting system information (SI) including random access configuration information, where the random access configuration information includes a common delay value. The common delay value may be defined as the propagation delay between the base station and a reference point in the cell coverage area of the base station.

BRIEF DESCRIPTION OF THE DRAWINGS

A better understanding of the present subject matter can be obtained when the following detailed description of the preferred embodiment is considered in conjunction with the following drawings.

FIG. 10A illustrates the structure of a RACH-ConfigCommon message according to 3GPP TS 38.331.

FIG. 10B illustrates the structure of a RACH-ConfigGeneric message according to 3GPP TS 3833.1.

FIG. 10C illustrates the concept of differential delay, according to some embodiments.

FIG. 11 illustrates a set of Physical Random Access Channel (PRACH) configurations, according to 3GPP TS 38.211.

FIG. 13 illustrates a method for operating a base station, according to some embodiments. This method may enable the base station to support random access by user equipment device in the context where propagation delays between the base station and the user equipments is large.

Figure 1:
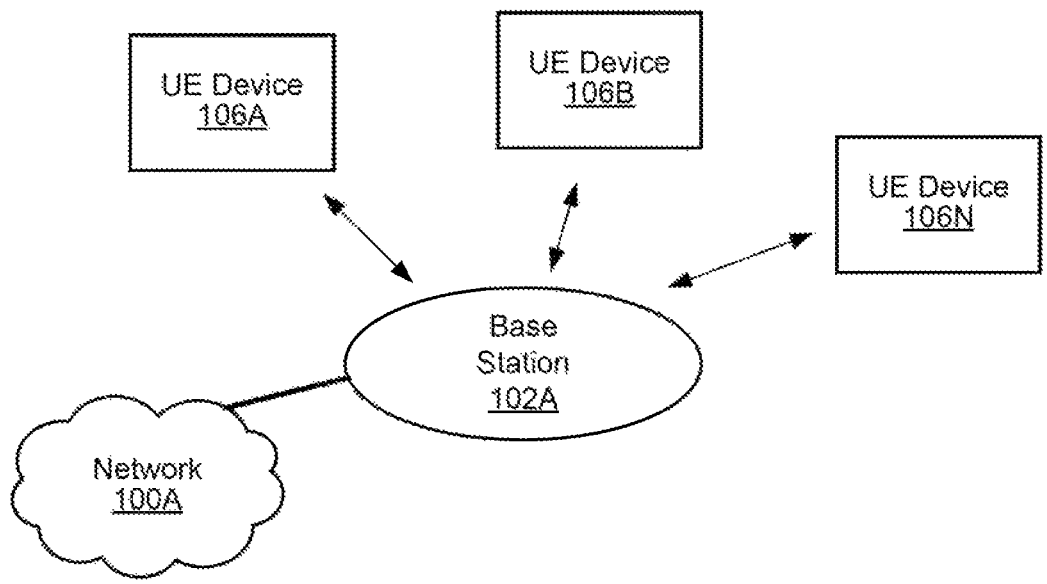
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: $5^{th}$ Generation New Radio
BW: Bandwidth
BWP: Bandwidth Part
CQI: Channel Quality Indictor
DCI: Downlink Control Information
DL: Downlink
DRX: Discontinuous Reception Cycle
eNB (or eNodeB): Evolved Node B, i.e., the base station of 3GPP LTE
UNB (or gNodeB): next Generation NodeB, i.e., the base station of 5G NR
GSM: Global System for Mobile Communications
HARQ: Hybrid ARQ
LTE: Long Term Evolution
LTE-A: LTE-Advanced
MAC: Media Access Control
MAC-CE: MAC Control Element
NR: New Radio
NR-DC: NR Dual Connectivity
NW: Network
PRACH: Physical Random Access Channel
RA: Random Access
RACH: Random Access Channel
RAT: Radio Access Technology
RLC: Radio Link Control
RLF: Radio Link Failure
RLM: Radio Link Monitoring
RNTI: Radio Network Temporary Identifier
RRC: Radio Resource Control
RRM: Radio Resource Management
RS: Reference Signal
SR: Scheduling Request
SSB: Synchronization Signal Block
UE: User Equipment
Uplink
UMTS: Universal Mobile Telecommunications System

Terms

The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and for other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
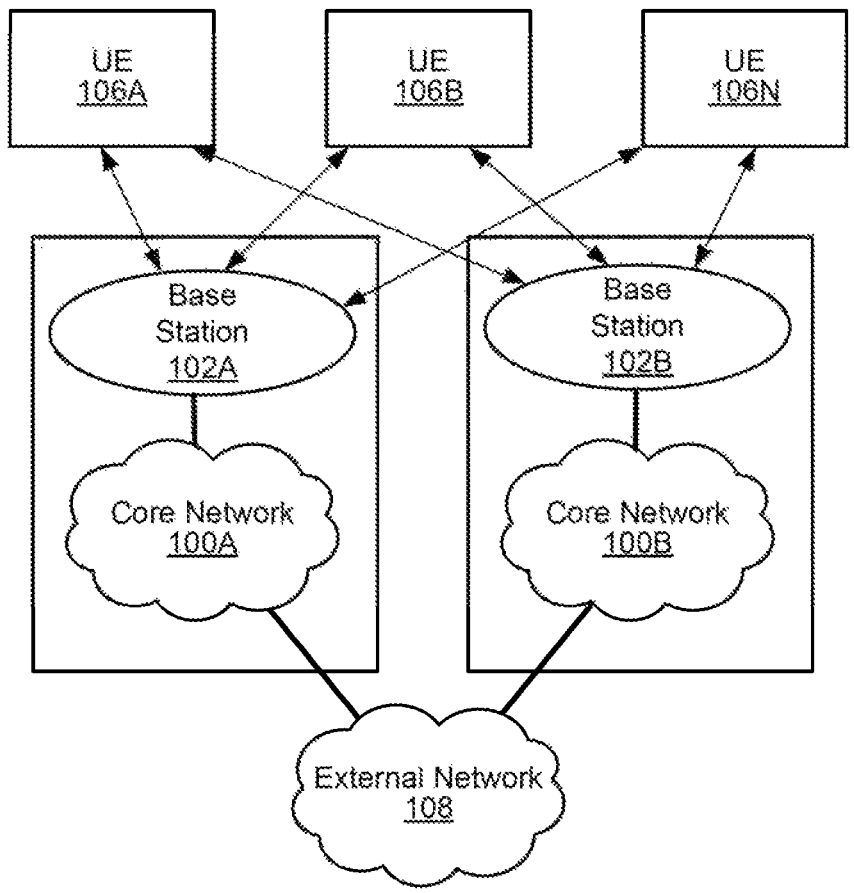
Figure 3:
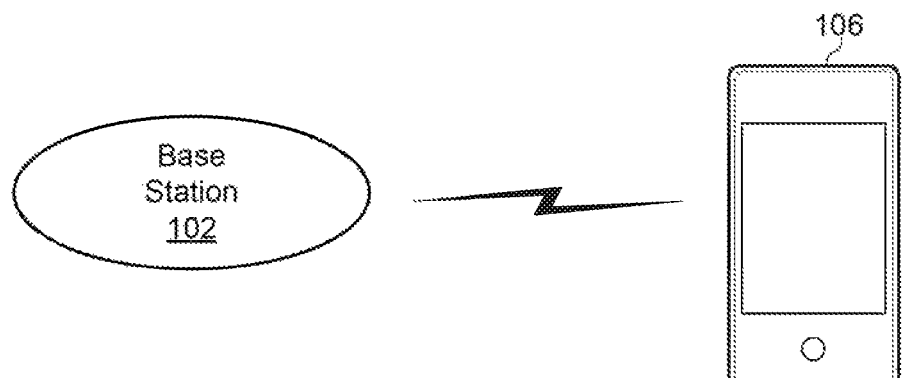
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108). Which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices mar be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc.

For example, base station 102A and core network 100A may operate according to a first cellular communication standard (e.g., LTE) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1×RTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using an of multiple wireless communication protocols. For example, the UE 106 may be configured to communicate using two or more of GSM, UMTS (W-CDMA, TD-SCDMA, etc.), CDMA2000 (1xRTT, 1xEV-DO) HRPD, eHRPD, etc.), LTE, LTE-A, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
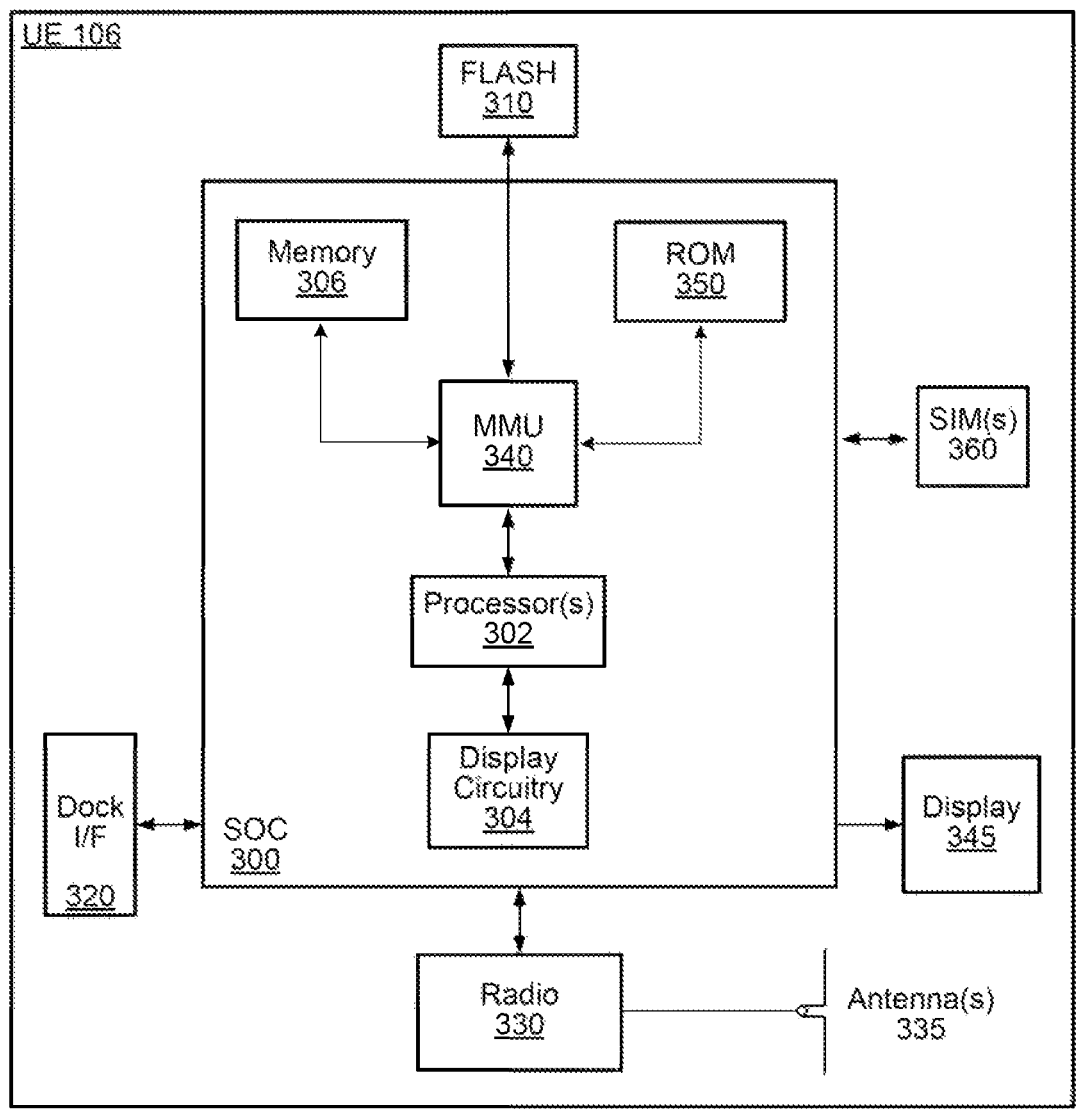
FIG. 4 illustrates an example of a block diagram of a user equipment device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, one or more of GSM, UMTS, LTE, LTE-A, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM UMTS, LITE, LTE-A, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or more of the SIMs 360 may be implemented as removeable SIM cards.

The processor 302 of the UE device 106 may be configured to implement part or all of the methods described herein, e.g., by executing program instructions stored on a memory medium e.g., a non-transitory computer-readable memory medium). In other embodiments, processor 302 may be configured as or include: a programmable hardware element, such as an FPGA (Field Programmable Gate Array): or an ASIC (Application Specific Integrated Circuit); or a combination thereof.

Figure 5:
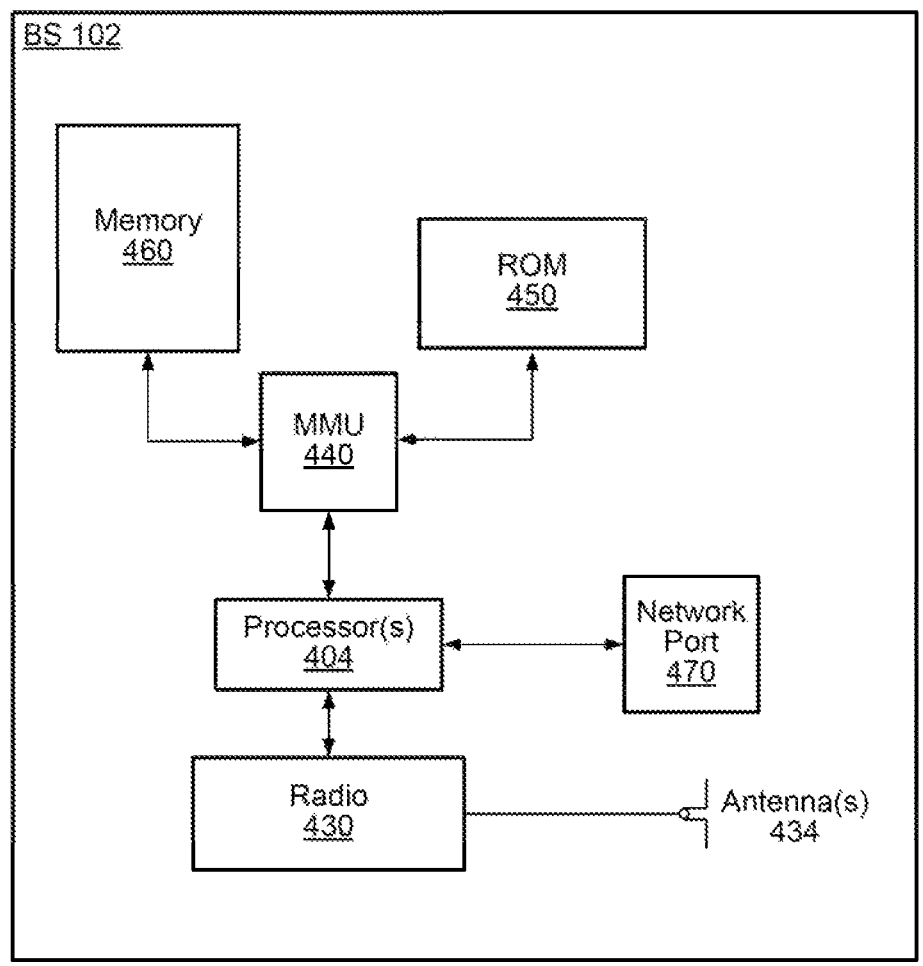
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MIMO or beamforming. The antenna subsystem 434 transmits and receives radio signals to/from UEs through the radio propagation medium (typically the atmosphere).

In some embodiments, the processor(s) 404 may include a baseband processor to generate downlink baseband signals and/or to process uplink baseband signals. The baseband processor 430 may be configured to operate according to one or more wireless telecommunication standards, including, but not limited to, GSM, LTE, WCDMA, CDMA2000, etc.

The processor(s) 404 of the base station 102 may be configured to implement part or all of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Figure 6:
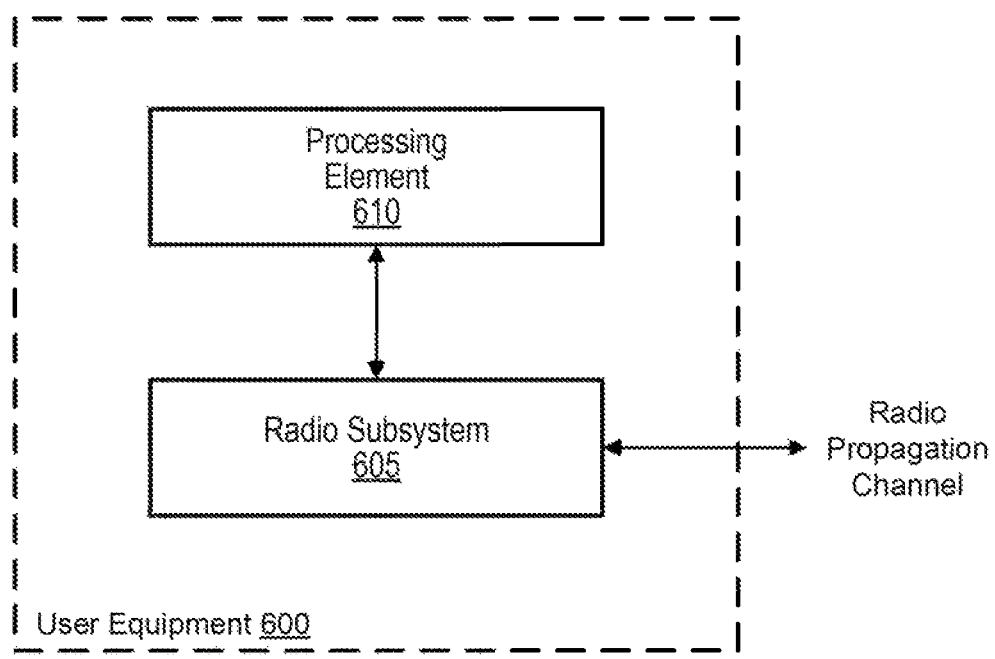
FIG. 6 illustrates an example of a user equipment 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or, one or more arrays of antennas) to facilitate signal transmission and reception. Each RF chain (or, some of the RF chains) may be turnable to a desired frequency, thus allowing the RF chain to receive or transmit at different frequencies at different times.

The processing element 610 may be coupled to the radio subsystem, and may be configured as variously described above. (For example, processing element may be realized by processor(s) 302.) The processing element may be configured to control the state of each RF In some embodiments, the processing element may include one or more baseband processors to (a) generate baseband signals to be transmitted by the radio subsystem and/or (b) process baseband signals provided by the radio subsystem.

In a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

The processing element 610 may be further configured as variously described in the sections below.

Figure 7:
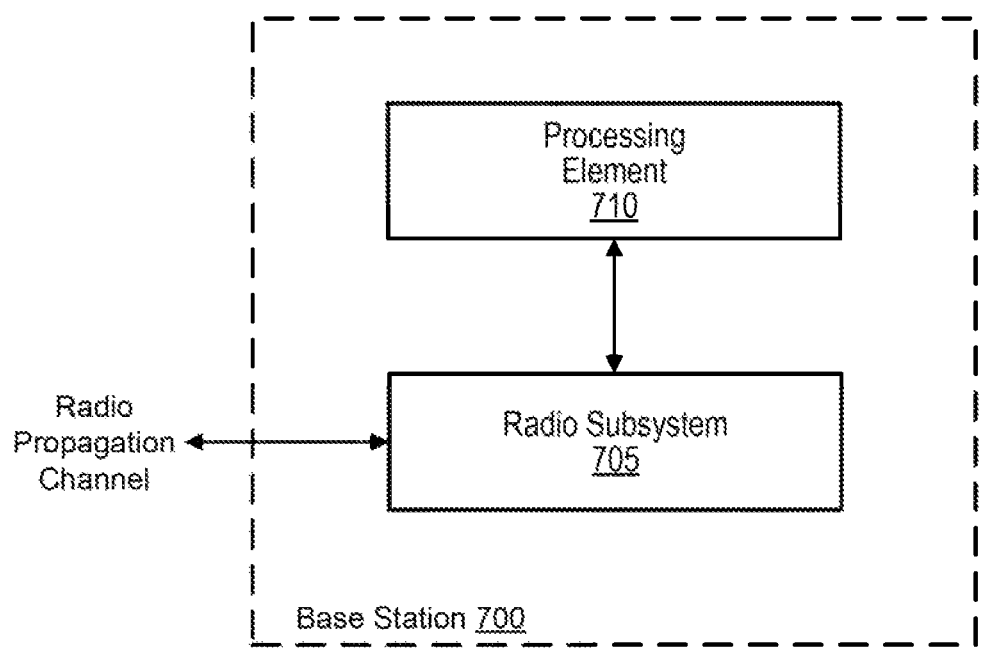
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.)

The radio subsystem 710 may include one or more RF chains. Each RF chain may be tunable to a desired frequency, thus allowing the RF chain to receive or transmit at different frequencies at different times. The radio subsystem 710 may be coupled to an antenna subsystem, including one or more antennas, e.g., an array of antenna, or a plurality of antenna arrays. The radio subsystem may employ the antenna subsystem to transmit and receive radio signals to/from radio wave propagation medium.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

The processing element 710 may be configured to perform any of the base station method embodiments described herein.

Resolution of Random-Access Radio Network Temporary Identifier (RA-RNTI) Mismatch As diverse network technologies are integrated with more traditional cellular network technologies, new network characteristics may arise. As one example, introducing new classes of cellular base stations may introduce propagation delays that are noticeably greater, and noticeably more variable, than those associated with more traditional base stations.

For example, 3GPP has engaged in multiple study items regarding integration of non-terrestrial networks (NTN) into the 3GPP ecosystem. See, e.g., 3GPP TR 38.811, 3GPP TR 22.822, 3GPP Work item 860046 (sNR_NTN_solutions). In such systems, propagation delays between a UE, such as the UE 106, and a non-terrestrial network may be far greater than propagation delays between the UE and a traditional terrestrial base station. Additionally, such systems may include cells covering larger geographic areas than traditional cells, which may lead to a large differential in propagation delays between two points within a cell. In other words, in such systems, a UE located at a first point in a cell may experience a significantly greater propagation delay than a UE located at a second point in the same cell.

A network in which the propagation delay between base stations and user equipment (UE) devices is large (e.g., large compared to a slot duration, or large compared to a radio frame duration) may be referred to as a large propagation delay (LPD) network. For example, the base station may have a powerful transmitter and/or sensitive receiver, and thus, have a cell coverage area that is large. As another example, a base station may be located on one continent, while the UE devices are located on another continent. As yet another example, the base station may be located on a satellite (or airborne vehicle) while the UE devices are located in an earth footprint of the base station's beam, e.g., as in the context of a non-terrestrial network.

When the propagation delay between a base station and user equipment (UE) devices is large, the network may determine a common delay based on a distance between the base station and a reference point in a coverage area of the base station. (The coverage area may correspond to a region in which the strength of a transmit beam generated by the base station is greater than a threshold value.) The common delay may be defined as the propagation delay between the base station and the reference point. The common delay value may be signaled to UEs in the coverage area by means of a system information broadcast, e.g., in a system information block (SIB) such as SIB1 or SIB2. Each UE device receive the system information broadcast and recover the common delay value from the system information broadcast. Each UE device may apply a timing advance to its transmission and/or reception processing based on the common delay value. The timing advance may be equal to two times the common delay value.

A network element (such as the base station or the UE device or a core network node) may compute a differential delay associated with a UE device, where differential delay is the difference between (a) the propagation delay between the base station and a UE device and (b) the propagation delay between the base station and the reference point. (In some embodiments, the differential delay may be interpreted as the propagation delay that would occur if the base station were located at the reference point.) Thus, the propagation delay between the base station and the UE device, which may be referred to as the full (or total) delay, is the sum of common delay and differential delay.

In a network with large propagation delay (LPD) between base station and UE devices, the cell size may likewise be large. Thus, the differential delay can have impacts on basic procedures such as random access. For example, the differential delay may vary significantly between UE devices within the cell: those UE devices that are "near cell" (e.g., relatively closer to the base station) will have smaller values of differential delay than UE devices that are "far cell" (e.g., relatively farther from the base station). Thus, RACH contentions may favor those UE devices that are near cell over those that far cell.

Figure 8A:
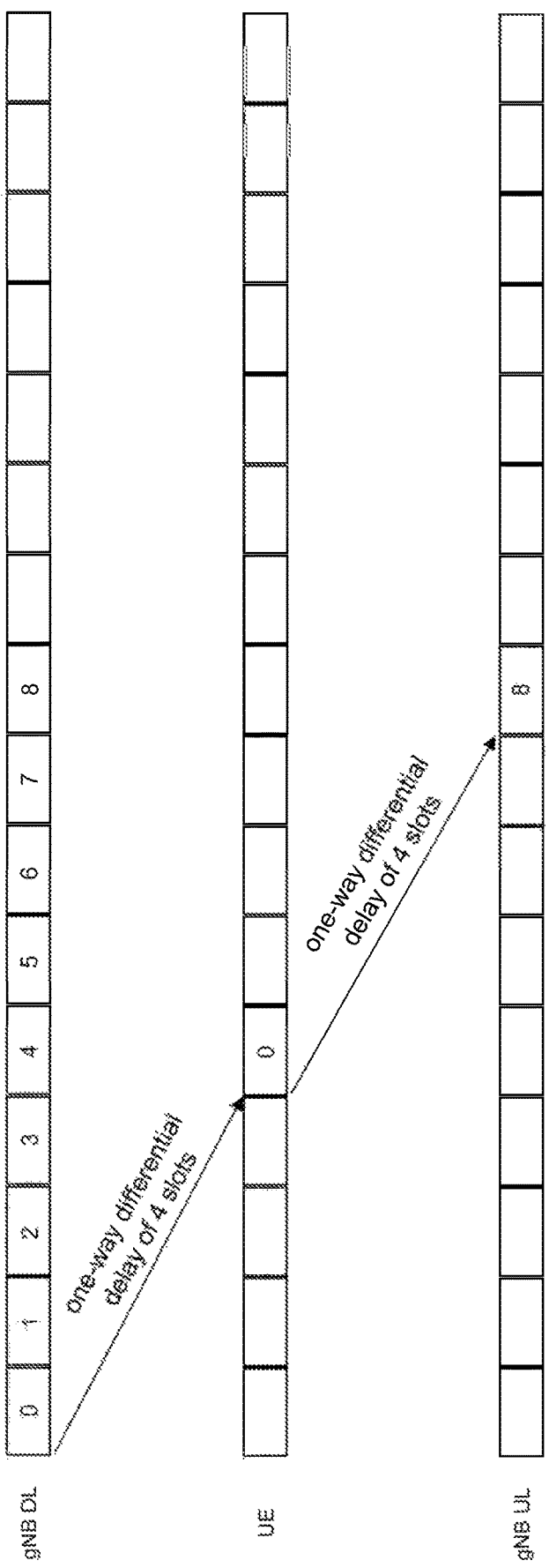
FIG. 8A illustrates an example of an 8 slot differential round trip time between a user equipment and a base station, according to some embodiments.

FIG. 8A shows an example of an 8 Slot Differential Round Trip Time (RTT) between the user equipment (UE) and the base station (e.g., a gNB of 3GPP NR), according to some embodiments. Three time lines are shown: one for gNB downlink, one for the UE, and one for the gNB uplink. The UE may transmit a random access preamble in what it perceives to be slot 0, e.g., after applying a timing advance equal to twice the common delay. Since the UE has not compensated for the unknown differential delay (which is illustrated as being 4 slots in length), the UE's transmission corresponds to slot 4 of the gNB downlink timing. The random access preamble is received at the time slot with slot index t_id=8. Thus, the UE will use t_id equal to 0 for its RA-RNTI calculation while the base station will use t_id equal to 8 for its RA-RNTI calculation. This is how the mismatch in RA-RNTI arises.

Figure 8B:
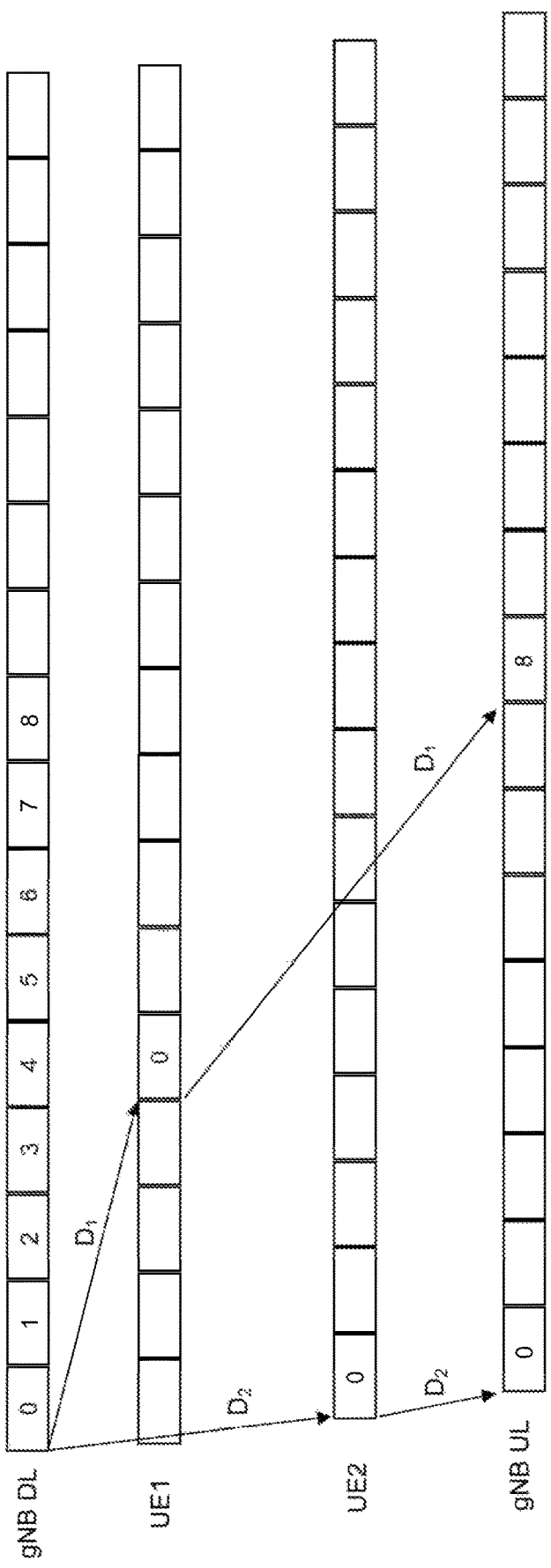
FIG. 8B illustrates an example of one user equipment having, an 8 slot differential round trip time versus another UE having a differential round trip time of less than one slot, according to some embodiments.

FIG. 8B shows an example of an 8 Slot Different al Round Trip Time versus a Differential Round Trip Time of less than one slot, according to some embodiments. UE1 is in a far cell condition (e.g., far from reference point) and has a one-way differential delay $D_1$ of four slots, UE2 is in a near cell condition (e.g., close to the reference point) and has a one-way differential delay $D_2$ of less than one slot. UE1's preamble transmission, in what it perceives to be slot 0, arrives at the gnB in slot 8. UE2's preamble transmission, in what it perceives to be slot 0, arrive at the gNB in slot 0. This scenario illustrates a violation of the desired specification of having a unique RNTI in a single radio frame. The gNB may compute a correct RA-RNTI value for UE2 but an incorrect value for UE1. Thus, without resolution of the issue of RA-RNTI mismatch, UEs farther from the reference point may experience random access failure while UEs close to the reference point may experience successful random access. Such imbalance in network performance is not desirable.

RA-RNTI Calculation

Figure 9:
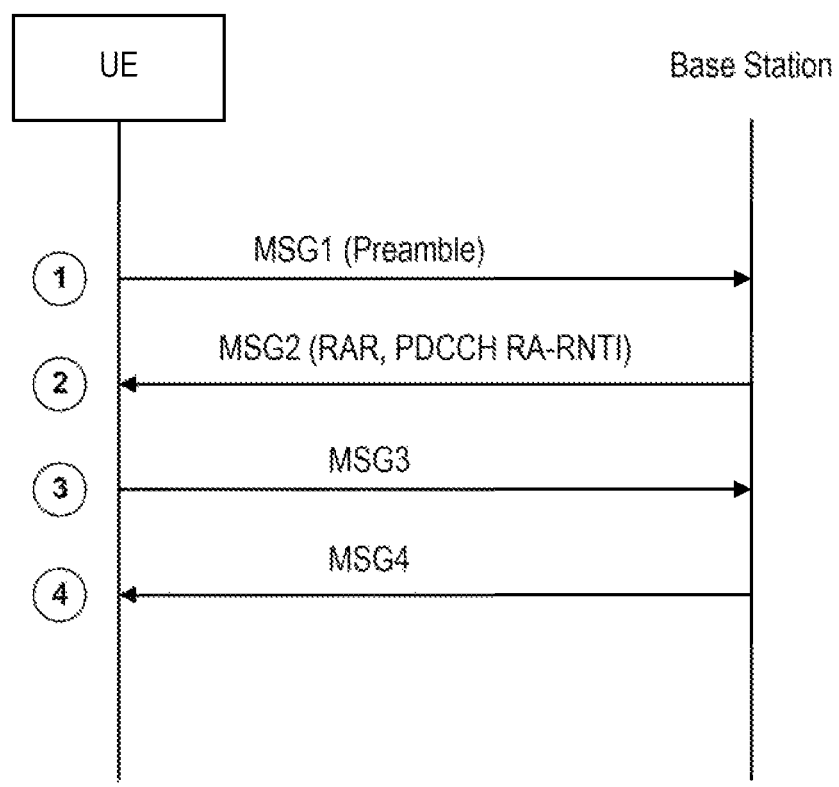
FIG. 9 illustrates a sequence of messages exchanged between a user equipment and base station during a random access procedure (RACH), according to some embodiments.

The Random Access Radio Network Temporary identifier (RA-RNTI) is used during random access procedure, e.g., as shown in FIG. 9. The base station's MAC generates a Random Access Response (RAR) as a response to the Random Access Preamble transmitted by the UE. The RAR is transmitted on DL-SCH transport. (MAC is an acronym for Media Access Control.) In some embodiments, the base station may be, e.g., a gNB of 3GPP NR.

The base station scrambles the PDCCH's Cyclic Redundancy Checksum (CRC) with the RA-RNTI, for transmission of PDSCH that carries RAR(s). The RA-RNTI can be addressed to multiple UEs, e.g., multiple UEs might decode the PDCCH scrambled using the same RA-RNTI.

The RA-RNTI associated with the Physical Random Access mud (PRACH) where the Random Access Preamble is transmitted may be computed follows:

$$\text{RA-RNTI}=1+s\_id+14\times t\_id+14\times 80\times f\_id+14\times 80\times 8\times ul\_carrier\_id.$$

TABLE

RA-RNTI Calculation Variables

| Variable | Detail |
| --- | --- |
| s_id | Index of the first OFDM symbol of the specified PRACH (0 ≤ s_id < 14) |
| t_id | Index of the first slot of the specified PRACH in a system frame (0 ≤ t_id < 80) |
| f_id | Index of the specified PRACH in the frequency domain (0 ≤ f_id < 8) |
| ul_carrier_id | Uplink carrier used for Msg1 transmission (0 for NUL carrier, and 1 for SUL carrier) |

More generally, the RA-RNTI may be computed based a function (e.g., a linear function) of the variables s_id, t_id, f_id and ul_carrier_id, or any subset of those parameters. In some embodiments, the set of variables may be expanded to include one or more variables in addition to those given here.

As it can be seen from the example of FIG. 8A, the value of t_id used by the UE (4) is different from the t_id used by the gNB (8). This mismatch will cause the RAR message to fail. In some embodiments, t_id is defined only for a single radio frame, e.g., a single radio frame of 10 ms.

Thus, there exists a need for a mechanism enabling a large propagation delay (LPD) network to use the already-existing subframe number for Random Access Channel (RACH) RA-RNTI to infer UE transmission of the Preamble. Furthermore, there exists a need to ensure fairness when two UEs are in different cell conditions (or same cell condition) with different differential delays in terms of RACH procedure.

In response to reception of the random access response the UE may transmit a third message (MSG3) of the random access procedure. The third message may be transmitted using resources and/or transmission parameters indicated in the random access response.

In response to receiving the third message, the base station may transmit a fourth message (MSG4) of the random access procedure. The contents of the third and fourth messages may depend on the purpose for which the random access procedure was initiated by the UE. Random access may be initiated for any of various purposes, such as: initial access from an idle state; re-establishment of an RRC connection; handover (contention based or non-contention based); uplink data arrival during an RRC connected state; when a timing advance is needed. (RRC is an acronym for Radio Resource Control.)

Implicit Indication of the Slot Used by the User Equipment

In some embodiments, the slot used by the user equipment (UE) may be implicitly indicated to the base station. This implicit mechanism doesn't require any change to the RA-RNTI computation or the RA-RNTI space (i.e., the number of RNTIs). Notice that if we extend t_id, then the number of RA-RNTI will grow.

In some embodiments, the UE and/or the base station (e.g., gNB) may employ a common compensation of the round trip time (RTT) or a common compensation of one-way propagation delay.

The base station may broadcast in SIB1 or SIB2 (i.e., System Information Block #2) a common delay value that compensates for most of the RTT, e.g., so that the differential delay is less a frame length. UEs may take this common delay into account while starting various procedures.

In some embodiments, the remaining delay (after the compensation) is the differential delay. The differential delay varies for different positions of the UE within the cell.

According to 3GPP Technical Report 38.821, the assumption for the differential one-way delay between gNB and UE is approximately 3 ms. However, it should be understood that different assumptions may be made in different embodiments.

In some embodiments, the space of preambles may be partitioned into separate groups, and each group assigned into a corresponding slot. This concept may be summarized as "grouping preambles per slot". In a random access (RACH) configuration, in any given slot, only a subset of preambles can be used. Thus, when the base station detects a preamble, it knows which slot was used for the RACH preamble transmission by the UE. This slot index may be used for the RA-RNTI computation.

In some embodiments, the configuration of Physical Random Access Channel (PRACH) transmission parameters may be based on: PRACH preamble format; tune resources; frequency resources; and parameters for determining the root sequences and their cyclic shift. The parameters for determining the root sequences and their cyclic shifts may include: an index to a logical root sequence table; cyclic shift (Ncs); and set type (unrestricted vs restricted).

Based on these PRACH transmission parameters (or a subset thereof), the UE may generate the available set of random access preambles (e.g., a set of 64 preambles, in one embodiment) for the Physical Random Access Channel (PRACH), and will select one randomly, for PRACH transmission.

In some embodiments, SIB1 or SIB2 (System Information Block. #2) may be a modified version of the SIB1/SIB2 defined in 3GPP Technical Specification 38,331. For example, a new RACH Information Element (IE) may be added to the RACH-ConfigCommon structure, to indicate the common delay offset. For example "ra-CommonDelay-Offset INTEGER (1 . . . ranger)" may be added to the RACH-Configuration Common shown in FIG. 10A. FIG. 10B shows the RACH-ConfigGeneric structure according to 3GPP TS 38.331.

In some embodiments, a mapping from logical index i to sequence number u may be as defined as defined in 3GPP Technical Specification 38.211, e.g., as defined in Table 6.3.3.1-3 of that Specification. However, it should be noted that a wide variety of other mappings may be used in other embodiments.

The PRACH configuration index may also specify the set of time resources allowed for PRACH transmission, e.g., a set of subframe numbers.

FIG. 10C illustrates the concept of differential delay, according to some embodiments. First, a common delay $D_{common}$ is defined as the delay between the base station (BS) and a reference point in the cell coverage area of the base station. The delay $D_{BS,UE}$ between the base station and a user equipment (UE) depends on the location of the UE within the cell coverage area. The differential delay $\Delta D$ is defined as the difference between and $D_{BS,UE}$ and $D_{common}$: $\Delta D = D_{BS,UE} - D_{common}$. Note that there need not be any device located at the reference point.

In some embodiments, the reference point may be represented by a set of spatial coordinates in the memory of the base station or the memory of a core network node. The base station and/or the core network node may use the spatial coordinates of the reference point and the spatial coordinates of the base station to compute the common delay.

FIG. 11 illustrates a set of Physical Random Access Channel (PRACH) configurations as defined in 3GPP TS 38.211. Each configuration may have corresponding values for PRACH Configuration Index, preamble format, x, y, subframe number, starting symbol, number of PRACH slots within a subframe, number $N_t^{RA,slot}$ of time-domain PRACH occasions within a PRACH slot, and PRACH duration $N_{dur}^{RA}$. It should be understood that the set of PRACH configurations and their indices may be differently defined in different embodiments.

In some embodiments, the set of preambles may be equally (or approximately equally) split among the available subframes of a PRACH configuration. For example, if the configuration index is 19, then the first 32 preambles used for PRACH may be transmitted in subframe 1, and the remaining 32 preambles may be transmitted in subframe 6. As another example, if the configuration index is 22, slots 1, 4 and 7 may be respectively assigned 21, 21 and 22 preambles.

In some embodiments, an additional column may be added to the table of FIG. 11, to specify which preambles are sent in which subframes.

In some embodiments, a new PRACH Configuration Index value (e.g., value equal to 33) may be added to the table of FIG. 11, for UEs operating in the context of large propagation delay. The subframe number field for this new configuration may include a plurality of distinct subframe numbers, in $n_1, n_2, \ldots n_L$, where L>1. For simplicity, the subframe numbers $n_1, n_2, \ldots n_L$ may be organized m increasing order, and each subframe number may be greater than or equal to zero, and less than or equal to a maximum subframe number $n_{Max}$:

$$0 \leq n_1 < n_2 < \ldots < n_L \leq n_{Max}.$$

Typical examples for the subframe number field of the new configuration include, {0, 3, 6}, {1, 4, 7}, {0, 2, 7}, {0, 4}, {2, 7}, {1, 8}, {0, 2, 4, 6}, {1, 4, 7, 8}, to name a few examples. When a UE receives this new PRACH configuration index value, it may transmit a random access preamble in a time slot determined according to the above described partitioning of preamble space among the configured subframe numbers (or slots). The UE may select one of the configured subframe numbers for transmission of its random access preamble.

By such an implicit mechanism, based an the detected preamble, the base station may determine which time resource was used for the preamble transmission, and then determine the slot index t_id to be used for the computation of RA-RNTI.

In some embodiments, as a further extension, the subframes used by UE devices in a LPD network may be restricted. For example, such devices may be restricted to transmit the random access preamble only in a single subframe. In some embodiments, the base station may transmit a configuration message (e.g., an RRC message) that restricts the UE device to a random access (RACH) configuration that indicates only one subframe. In other embodiments, a wireless communication standard may define that UE devices operating in the context of large propagation delay to/from a base station (e.g., a base station in a non-terrestrial network) will use a default configuration that restricts the UE device to a single subframe for preamble transmission. Thus, the UE device, acting on the configuration, may be restricted to the single subframe without receiving a random access configuration message.

Figure 12:
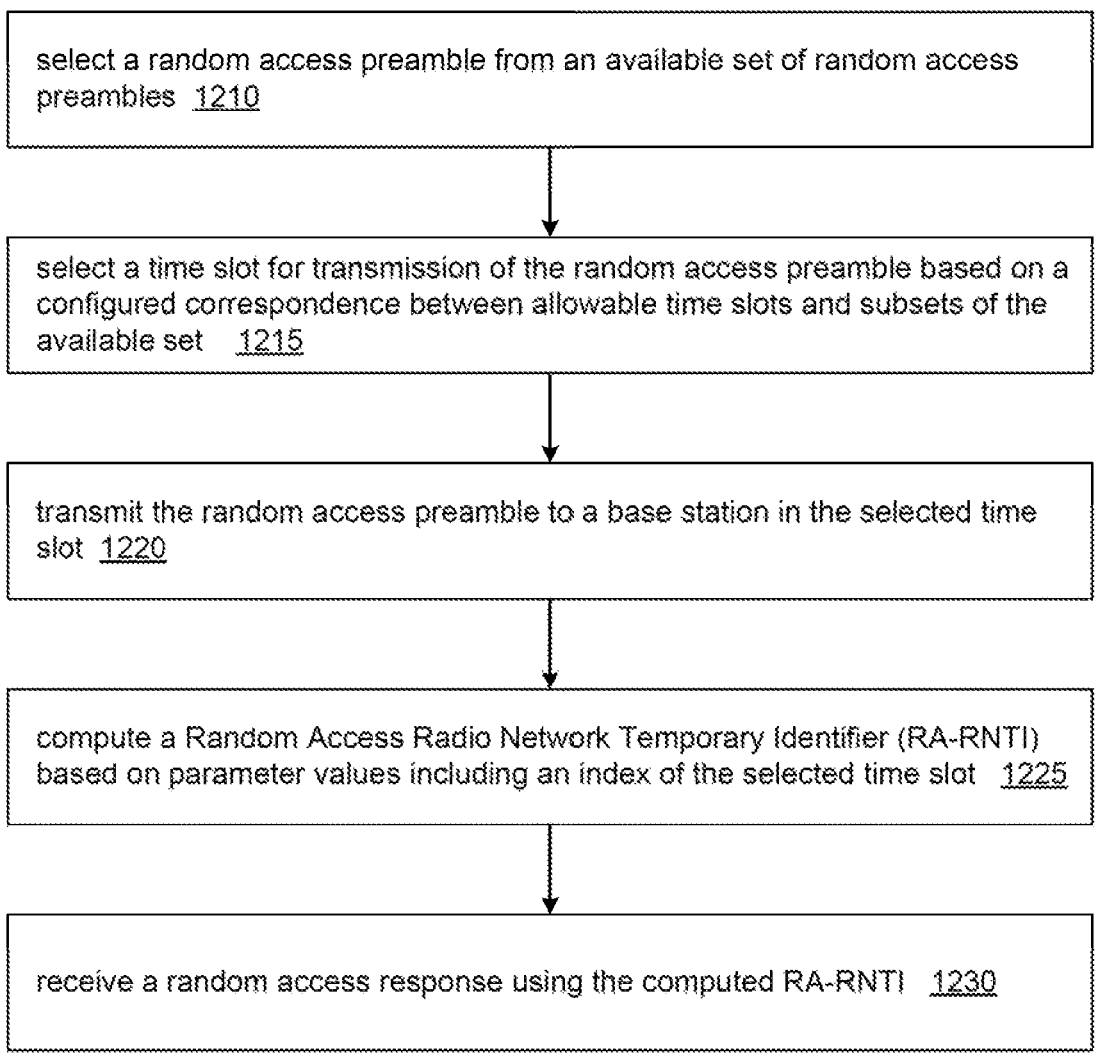
FIG. 12 illustrates a method for operating a user equipment device, according to some embodiments. This method may enable the user equipment to perform random access with a base station in the context where propagation delay between the user equipment and the base station is large.

In one set of embodiments, a method 1200 for operating a user equipment (UE) device may include one or more of the operations shown in FIG. 12. (The method 1200 may also include any subset of the features, elements or operations described above.) The method may be performed by processing circuity of the UE device, e.g., by the processing element 610 of user equipment 600. The UE device may be configured for communication with an LPD network, where the propagation delay between the UE and a base station of the LPD network is large, e.g., larger than a slot duration, or larger than a radio frame duration.

At 1210, the processing circuitry may select, e.g., randomly select, a random access preamble from an available set of random access preambles. Processes for randomly selecting, and for generating the selected random access preamble are well known in the art of wireless communication.

At 1215, the processing circuitry may select a time slot for transmission of the random access preamble based on a configured (or predetermined) correspondence between allowable time slots and subsets of the available set. The correspondence (or mapping) between the allowable time slots and subsets of the available set may be indicated by configuration information provided by the base station. For example, the base station may transmit a Physical Random Access Channel (PRACH) configuration index that indicates the allowable time slots and the correspondence. The processing circuitry may determine Which of the subsets the selected random access preamble belongs to, and select the time slot corresponding to that subset.

At 1220, the processing circuitry may transmit the random access preamble to a base station in the selected time slot. As described above in connection with FIG. 6, the processing circuitry may perform transmission and reception operations using radio subsystem 605. For example, the processing may transmit the random access preamble, by supplying the random access preamble to the radio subsystem and directing the radio subsystem.

At 1225, the processing circuitry may compute a Random Access Radio Network Temporary Identifier (RA-RNTI) based on parameter values including an index of the selected time slot. The RA-RNTI may be computed as described above.

At 1230, the processing circuitry may receive (or detect) a random access response using the computed RA-RNTI.

In some embodiments, before transmitting the random access preamble, the processing circuitry may receive an indication of a common delay from the base station. (The common delay may be defined as the propagation delay between the base station and a reference point in the cell coverage area of the base station. The indication of the common delay may be received as part of system information, e.g., as variously described above.) The random access preamble may be transmitted with a timing advance based on the common delay (e.g., equal to two times the common delay).

In some embodiments, the indication of the common delay may be received as a part of system information from the base station, e.g., as variously described above.

In some embodiments, the method 1200 may also include accounting for the common delay when starting one or more procedures.

In some embodiments, after transmitting the random access preamble, the processing circuitry may receive an indication of a differential delay value from the base station. The processing circuitry may add the differential delay value to the common delay, to obtain a total delay value. The processing circuitry may applying a timing advance to transmission and/or reception timing of the UE device, where the timing advance is based on the total delay value (e.g., equal to two times the total delay value).

In some embodiments, prior to the action of selecting the time slot, the processing circuitry may receive an indication of a preamble configuration from the base station. The preamble configuration may indicate the allowable time slots and the correspondence between the allowable time slots and the subsets of the available set of random access preambles.

In some embodiments, an uncompensated round trip propagation time between the base station and the UE device is greater than a radio frame duration.

In some embodiments, the random access preambles of the available set are evenly divided among the subsets, e.g., as variously described above.

In some embodiments, the base station may be a gNB conforming to the 3GPP New Radio standard, or an eNB conforming to the 3GPP Long Term Evolution standard.

In one set of embodiments, a method 1300 for operating, a base station may include one or more of the operations shown in FIG. 13. (The method 1300 may also include any subset of the features, elements or operations described above.) The method may be performed by processing circuitry of the base station, e.g., by the processing, element 710 of base station 700. The base station may operate in (or be part of) a Large Propagation Delay (LPD) network, where the propagation delay between the base station and UE devices is large, e.g., larger than a slot duration, or larger than a radio frame duration.

At 1310, the processing circuitry may receive a random access preamble from a user equipment (UE) device. For example, the processing circuitry perform correlation computations, to compare a received signal with random access preambles in an available set of random access preambles. When one of the correlations produces a strong correlation peak (e.g., greater than a threshold value), the processing circuitry may recognize that the corresponding preamble is present in the received signal. The location of the correlation peak may indicate the time of occurrence of the preamble in the received signal.

At 1315, the processing circuitry may determine a time slot in which the random access preamble was transmitted by the UE device. The determination of this time slot may be based on a configured (or predetermined) correspondence between allowable time slots and subsets of an available set of random access preambles. (The UE device is assumed to have transmitted the random access preamble in a time slot that respects the correspondence between the allowable time slots and the subsets, as variously described above.) For example, the processing circuitry may determine which of the subsets the random access preamble belongs to, and identify the time slot corresponding to the subset as the time slot in which the preamble was transmitted.

At 1320, the processing circuitry may compute a Random Access Radio Network Temporary Identifier (RA-RNTI) based on parameter values including an index of the determined time slot. e.g., as variously described above.

At 1325, the processing circuitry may generate a random access response for the UE device, in response to reception of the random access preamble. In some embodiments, the content of the random access response may be consistent with an existing wireless communication standard such as 3GPP Lone Term Evolution (LTE) of 3GPP New Radio (NR).

At 1330, the processing circuitry may generate a Physical Downlink Control Channel (PDCCH), where the action of generating the PDCCH includes scrambling a Cyclic Redundancy Checksum (CRC) of downlink control information (DCI) using the RA-RNTI. (The expression, "scrambling the CRC" is meant to include scrambling the entire CRC, or scrambling, only a subset of the CRC bits.) The downlink control information may correspond to the random access response, e.g., point to a Physical Downlink Shared Channel (PDSCH) resource containing the random access response for the UE.

At 1335, the processing circuitry may transmit the PDCCH and the random access response, e.g., as part of a subframe of a downlink signal. The UE device, having independently computed the RA-RNTI, may monitor subframes of the downlink signal for any DCI whose CRC has been scrambled with the RA-RNTI.

In some embodiments, the method 1300 may also include, prior to receiving the random access preamble, transmitting an indication of a common delay value to UE devices in a cell coverage area of the base station. Each UE device may receive the indication, and apply a timing advance its transmission and/or reception processing. The timing advance may be based on the common delay value (e.g., equal to two times the common delay value).

In some embodiments, the method 1300 may include determining a differential round trip time (RTT) based on (a) the time slot that has been determined based on the received random access preamble and the correspondence between time slots and preamble subsets; (b) time slot in which the random access preamble is received at the base station, (d) the common delay.

In other embodiments, the method 1300 may include determining a differential round trip time (RTT) based on (a) a time at which the random access preamble was received at the base station and (b) a time of the base stations transmission of a particular slot whose time index agrees with the determined time slot. The particular slot is unique because it occurs prior to time (a) and within one frame duration of time (a), due to UE device's timing advance based on the common delay.

In some embodiments, the method 1300 may also include transmitting an indication of a differential delay value to the UE device, where the differential delay value is one half the differential RTT. The UE device may use the differential delay value together with the common delay value to determine a total delay, and apply a timing advance based on the total delay, e.g., so that its uplink transmissions will arrive at the base station in synchrony with the base station's tuning, and/or, so that its reception of downlink channels from the base station will be synchronized with the arrival of those units at the UE device.

In some embodiments, the method 1300 may also include broadcasting, system information (SI) including random access configuration information, where the random access configuration information includes a common delay value, e.g., as variously described above. The common delay value may be defined as the propagation delay between the base station and a reference point in the cell coverage area of the base station.

In some embodiments, the processing circuitry may transmit an indication of a preamble configuration. The preamble configuration may indicate (a) the allowable time slots and (b) the correspondence between allowable time slots and subsets of the available set of random access preambles. The UE device employ this information when selecting the time slot for transmission of the random access preamble.

In some embodiments, an uncompensated round trip propagation time between the base station and the UP device is greater than a radio frame duration.

In some embodiments, the random access preambles of the available set are evenly divided among the subsets, e.g., as variously described above.

In some embodiments, the base station may be a gNB conforming to the 3GPP New Radio standard, or an eNB conforming to the 3GPP Long Term Evolution standard.

In one set of embodiments, a method for operating a base station may include one or more of the following operations. The method may include receiving a random access preamble. The method may include determining a time index for the random access preamble according to a grouping of random access preambles per slot (or other time unit). The method may include calculating, a Random Access Radio Network Temporary Identifier (RA-RNTI) based on the determined time index. The method may include generating a random access response message in response to receiving the random access preamble, where the random access response message includes a Physical Downlink Control Channel (PDCCH), where a Cyclic Redundancy Checksum (CRC) of the PDCCH is scrambled with the RA-RNTI. The method may include transmitting the random access response message. The method may also include any subset of the features, elements and operations described above described above in connection with FIGS. 1-14.

In one set of embodiments a method for operating a user equipment (UE) may include: selecting a random access preamble from an allowable set of random access preambles; and transmitting a random access preamble in a particular slot, according to a random access preamble configuration in which different slots are assigned different subsets of the allowable set of random access preambles. The method may also include any subset of the features, elements and operations described above described above in connection with FIGS. 1-14.

In one set of embodiments, a method for operating a base station may include: receiving a random access preamble from an uplink signal; and determining a time index for calculation of a Random Access Radio Network Temporary Identifier (RA-RNTI), based on a random access preamble configuration in which different slots are assigned different subsets of an allowable set of random access preambles. The method may also include any subset of the features, elements and operations described above in connection with FIGS. 1-14.

In one set of embodiments, a method for operating a base station may include one or more of the following operations. The method may include receiving a random access preamble transmitted by a UE as part of a random access procedure. The method may include determining a time index of a slot that was used for detection of the random access preamble detection (or, an index of a time unit that was used by the UE to transmit the preamble). The method may include calculating an RA-RNTI using the time index. The method may include transmitting a random access response message in response to receiving the random access preamble, where the random access response message includes a Physical Downlink Control Channel (PDCCH), where a Cyclic Redundancy Checksum (CRC) of the PDCCH is scrambled with the RA-RNTI. The method may also include any subset of the features, elements and operations described above described above in connection with FIGS. 1-14.

In one set of embodiments, a method for operating a user equipment (UE) may include generating a set of $N_P$ preambles for random access and randomly selecting one of the $N_P$ preambles for transmission to a base station, where transmission parameters for the transmission are based on any subset of the following: Physical Random Access Channel (PRACH) Preamble format; time resources; frequency resources; parameters for determining the root sequences and their cyclic shifts. The method may also include any subset of the features, elements and operations described above described above in connection with FIGS. 1-14. In some embodiment, the parameters for determining the root sequences and their cyclic shifts include: an index to a logical root sequence table; a cyclic shift value; and a set type (unrestricted vs restricted).

In one set of embodiments, a method for operating a base station may include transmitting a physical random access channel (PRACH) configuration index to one or more user equipment (UE) devices, where the PRACH configuration index indicates a time resource or a set of time resources) to be used by the one or more UE devices for PRACH transmission. The method may also include any subset of the features, elements and operations described above described above in connection with FIGS. 1-14. In some embodiments, the PRACH configuration index indicates a subframe number (or a set of subframe numbers) to be used by the one or more UE devices for PRACH transmission.

In one set of embodiments, a method for operating a user equipment (UE) may include transmitting a selected Physical Random Access Channel (PRACH) preamble in a subframe, according to a PRACH configuration in which a set of possible preambles are divided (or partitioned) among two or more allowable subframes, where the two or more allowable subframes have been indicated to the UE in a PRACH configuration index. The method may also include any subset of the features, elements and operations described above described above in connection with FIGS. 1-14.

In one set of embodiments, a method for operating a base station may include one or more of the following operations. The method may include receiving a PRACH preamble. The method may include determining a time index of a subframe in which a PRACH preamble was transmitted by a user equipment (UE), based on which subset, among a plurality of disjoint subsets of an allowable set of PRACH preambles, the received PRACH preamble belongs to. The method may include calculating an RA-RNTI based on the determined time index. The method may also include any subset of the features, elements and operations described above described above in connection with FIGS. 1-14.

In one set of embodiments, a method for operating a user equipment (UE) in a large propagation delay (LPD) network may include: receiving a configuration for random access from a base station, where the configuration restricts the transmission of random access preambles to a single predetermined subframe; and transmitting a random access preamble in the single predetermined subframe. The method may also include any subset of the features, elements and operations described above described above in connection with FIGS. 1-14.

In one set of embodiments, a method for operating a base station may include one or more of the following operations. The method may include transmitting a configuration for random access to one or more user equipment (UE) devices, where the configuration restricts the transmission of random access preambles to a single predetermined subframe. The method may include receiving a random access preamble from a user equipment (UE) device. The method may include setting a time index to a value corresponding the single predetermined subframe. The method may include calculating an RA-RNTI using the time index value corresponding to the single predetermined subframe. The method may include transmitting a random access response message in response to receiving the random access preamble, where the random access response message includes a Physical Downlink Control Channel (PDCCH), where a Cyclic Redundancy Checksum (CRC) of the PDCCH is scrambled with the RA-RNTI. The method may also include any subset of the features, elements and operations described above described above in connection with FIGS. 1-14.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset or any of the method embodiments described herein, or, any combination of such subsets.

In some embodiments, a user equipment device may be configured to communication with and perform random access to (a) base stations of an LPD network as variously described herein and b) legacy base stations where round trip time between base station and the user equipment device significantly less than a slot duration.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

It is understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a base station, comprising:
broadcasting an indication of a common delay value to UE devices in a cell coverage area of the base station;
after broadcasting the indication of the common delay value, receiving a random access preamble from a user equipment (UE) device;
determining a time slot in which the random access preamble was transmitted based on a configured correspondence between allowable time slots and subsets of an available set of random access preambles;
computing a Random Access Radio Network Temporary Identifier (RA-RNTI) based on parameter values including an index of the determined time slot; and
transmit to the UE device a differential delay value, wherein the sum of the common delay value and the differential delay value indicates a propagation delay between the base station and the UE device, wherein an uncompensated round trip propagation time between the base station and the UE device is greater than a radio frame duration, and wherein the common delay value is configured such that the differential delay is less than the radio frame duration.

2. The method of claim 1, further comprising:
generating a random access response for the UE device;
generating a Physical Downlink Control Channel (PDCCH), wherein said generating the PDCCH includes scrambling a CRC of downlink control information using the RA-RNTI, wherein the downlink control information corresponds to the random access response; and
transmitting the PDCCH and the random access response.

3. The method of claim 1, further comprising:
determining a differential round trip time (RTT) based on information including (a) a time slot at which the random access preamble was received at the base station and (b) the determined time slot, in which the random access preamble was transmitted.

4. The method of claim 1, further comprising:
broadcasting system information including random access configuration information, wherein the random access configuration information includes the common delay value.

5. The method of claim 1, further comprising:
transmitting an indication of a preamble configuration, wherein the preamble configuration indicates the allowable time slots and the correspondence.

6. The method of claim 1, wherein the random access preambles of the available set are evenly divided among the subsets.

7. The method of claim 1, wherein the base station is a gNB of the 3GPP 5G New Radio standard.

8. A base station, comprising:
an antenna for performing wireless communication;
a radio coupled to the antenna; and
processing circuitry coupled to the radio, and configured to:
cause the radio to broadcast an indication of a common delay value to UE devices in a cell coverage area of the base station;
after the broadcast of the indication of the common delay value, receive a random access preamble from a user equipment (UE) device;
determine a time slot in which the random access preamble was transmitted based on a configured correspondence between allowable time slots and subsets of an available set of random access preambles;
compute a Random Access Radio Network Temporary Identifier (RA-RNTI) based on parameter values including an index of the determined time slot; and cause the radio to transmit to the UE device a differential delay value, wherein the sum of the common delay value and the differential delay value indicates a propagation delay between the base station and the UE device, wherein an uncompensated round trip propagation time between the base station and the UE device is greater than a radio frame duration, and wherein the common delay value is configured such that the differential delay is less than the radio frame duration.

9. The base station of claim 8, wherein the processing circuitry is further configured to:
generate a random access response for the UE device;
generate a Physical Downlink Control Channel (PDCCH), wherein said generating the PDCCH includes scrambling a CRC of downlink control information using the RA-RNTI, wherein the downlink control information corresponds to the random access response; and
transmit the PDCCH and the random access response.

10. The base station of claim 8, wherein the processing circuitry is further configured to:
determine a differential round trip time (RTT) based on information including (a) a time slot at which the random access preamble was received at the base station and (b) the determined time slot, in which the random access preamble was transmitted.

11. The base station of claim 8, wherein the processing circuitry is further configured to:
broadcast system information including random access configuration information, wherein the random access configuration information includes the common delay value.

12. The base station of claim 8, wherein the processing circuitry is further configured to:
transmit an indication of a preamble configuration, wherein the preamble configuration indicates the allowable time slots and the correspondence.

13. The base station of claim 8, wherein the random access preambles of the available set are evenly divided among the subsets.

14. A non-transitory memory medium storing program instructions, wherein the program instructions, when executed by processing circuitry of a base station, cause the processing circuitry to:
cause a broadcast of an indication of a common delay value to UE devices in a cell coverage area of the base station;
after the broadcast of the indication of the common delay value, receive a random access preamble from a user equipment (UE) device;
determine a time slot in which the random access preamble was transmitted based on a configured correspondence between allowable time slots and subsets of an available set of random access preambles;
compute a Random Access Radio Network Temporary Identifier (RA-RNTI) based on parameter values including an index of the determined time slot; and
cause a transmission, to the UE device, of a differential delay value, wherein the sum of the common delay value and the differential delay value indicates a propagation delay between the base station and the UE device, wherein an uncompensated round trip propagation time between the base station and the UE device is greater than a radio frame duration, and wherein the common delay value is configured such that the differential delay is less than the radio frame duration.

15. The non-transitory memory medium of claim 14, wherein the program instructions further cause the processing circuitry to:
generate a random access response for the UE device;
generate a Physical Downlink Control Channel (PDCCH), wherein said generating the PDCCH includes scrambling a CRC of downlink control information using the RA-RNTI, wherein the downlink control information corresponds to the random access response; and
cause transmission of the PDCCH and the random access response.

16. The non-transitory memory medium of claim 14, wherein the program instructions further cause the processing circuitry to:
determine a differential round trip time (RTT) based on information including (a) a time slot at which the random access preamble was received at the base station and (b) the determined time slot, in which the random access preamble was transmitted.

17. The non-transitory memory medium of claim 14, wherein the program instructions further cause the processing circuitry to:
causing a broadcast of system information including random access configuration information, wherein the random access configuration information includes the common delay value.

18. The non-transitory memory medium of claim 14, wherein the program instructions further cause the processing circuitry to:
causing transmission of an indication of a preamble configuration, wherein the preamble configuration indicates the allowable time slots and the correspondence.

19. The non-transitory memory medium of claim 14, wherein the random access preambles of the available set are evenly divided among the subsets.

* * * * *